US011486712B2

(12) United States Patent
Richman (10) Patent No.: US 11,486,712 B2
(45) Date of Patent: Nov. 1, 2022

(54) PROVIDING VIDEO OF SPACE TO CALIBRATE USER LOCATION RELATIVE TO DESIRED DESTINATION

(71) Applicant: Sony Corporation, Tokyo (JP)

(72) Inventor: Steven Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 16/874,938

(22) Filed: May 15, 2020

(65) Prior Publication Data

US 2021/0356276 A1    Nov. 18, 2021

(51) Int. Cl.
*G01C 21/28* (2006.01)
*H04N 21/218* (2011.01)
*G01C 21/10* (2006.01)
*G06F 3/01* (2006.01)
*G01C 21/36* (2006.01)

(52) U.S. Cl.
CPC ............. *G01C 21/28* (2013.01); *G01C 21/10* (2013.01); *G01C 21/3673* (2013.01); *G06F 3/012* (2013.01); *G06F 3/013* (2013.01); *H04N 21/21805* (2013.01)

(58) Field of Classification Search
CPC .... G01C 21/10; G01C 21/28; G01C 21/3673; G06F 3/011; G06F 3/012; G06F 3/013; H04N 21/21805; H04N 21/25841; H04N 21/42202; H04N 21/47202; H04N 21/478; H04N 21/6587
See application file for complete search history.

(56) References Cited

U.S. PATENT DOCUMENTS

| | | | | |
|---|---|---|---|---|
| 8,363,102 B1* | 1/2013 | Kadoch | ................. | H04W 4/90 348/148 |
| 8,893,164 B1* | 11/2014 | Teller | ................. | G06Q 30/0252 725/12 |
| 8,910,217 B2* | 12/2014 | Tjio | ................. | H04N 21/2187 725/62 |
| 2006/0187305 A1 | 8/2006 | Trivedi et al. | | |
| 2007/0162487 A1* | 7/2007 | Frailey | ................. | H04N 19/40 707/999.102 |
| 2009/0087161 A1* | 4/2009 | Roberts | ................. | H04N 21/2743 386/285 |
| 2009/0148124 A1* | 6/2009 | Athsani | ................. | H04N 21/6582 386/241 |
| 2009/0204885 A1* | 8/2009 | Ellsworth | ................. | G06F 16/44 707/999.1 |
| 2010/0002084 A1* | 1/2010 | Hattori | ................. | G11B 27/034 348/207.1 |
| 2010/0075685 A1* | 3/2010 | Axnas | ................. | H04L 1/08 455/450 |
| 2010/0254295 A1* | 10/2010 | Ahn | ................. | H04N 21/2383 370/312 |
| 2012/0020307 A1* | 1/2012 | Henderson | ................. | H04L 41/0886 370/329 |

(Continued)

FOREIGN PATENT DOCUMENTS

WO    2020022942 A1    1/2020

*Primary Examiner* — Michael B. Pierorazio
(74) *Attorney, Agent, or Firm* — John L. Rogitz (57) ABSTRACT

A user can access live or historic video feeds of the location he is in and input a desired destination, and the video feeds show the surroundings and indicate a route to the destination, changing as the user moves toward the destination.

25 Claims, 5 Drawing Sheets

(56) References Cited

U.S. PATENT DOCUMENTS

| | | | |
|---|---|---|---|
| 2012/0040714 A1* | 2/2012 | Wu | H04B 1/3877 |
| | | | 455/552.1 |
| 2012/0075168 A1* | 3/2012 | Osterhout | G06F 3/017 |
| | | | 345/8 |
| 2012/0192242 A1* | 7/2012 | Kellerer | G06F 16/78 |
| | | | 725/116 |
| 2012/0229655 A1* | 9/2012 | Solomon | H04N 5/23225 |
| | | | 348/207.1 |
| 2013/0070047 A1* | 3/2013 | DiGiovanni | H04N 21/234345 |
| | | | 348/E7.001 |
| 2013/0104173 A1* | 4/2013 | Tjio | H04N 21/6131 |
| | | | 725/62 |
| 2014/0157336 A1* | 6/2014 | Deegan | H04L 65/765 |
| | | | 725/91 |
| 2015/0296371 A1* | 10/2015 | Kong | H04W 4/80 |
| | | | 455/419 |
| 2017/0270362 A1* | 9/2017 | Barnehama | G06F 1/163 |
| 2018/0302556 A1 | 10/2018 | Baran et al. | |
| 2019/0025583 A1* | 1/2019 | Mullins | G03H 1/2205 |
| 2019/0149731 A1 | 5/2019 | Blazer et al. | |

* cited by examiner

PROVIDING VIDEO OF SPACE TO CALIBRATE USER LOCATION RELATIVE TO DESIRED DESTINATION

FIELD

The present application relates to technically inventive, non-routine solutions that are necessarily rooted in computer technology and that produce concrete technical improvements.

BACKGROUND

People often find themselves inside of a building or an enclosed structure and do not know what direction they are facing or how to get back to where they came from. They can look on a kiosk with directions or a map of the property but that is largely information overload and the maps do not account for the visual cues and practical benefit of having walked the path before. Also, maps usually only get visitors as far as the parking lot, which does not actually find their car, only the location of the parking lot. If a person is wrong about where he parked, he could end up walking around for quite some time. The same consideration also applies to being in a building and not knowing what exit to take to get back on the street where entry was made, as well as to other circumstances.

SUMMARY

A system includes plural video cameras providing plural video feeds of a venue and at least one media server receiving the feeds and including at least one processor programmed to access instructions. The system also includes at least one display configured to communicate with the processor. The instructions are executable by the processor to receive a location of a user device, identify a desired destination, and present on the display at least one of the video feeds showing a portion of the venue in which the location of the user device is and also showing the destination, along with an indication of a route to the destination from the location.

The display may be implemented on the user device or a kiosk or TV in the venue.

In some examples the instructions can be executable to alter presentation of video on the display responsive to head or eye movement of the user. In non-limiting implementations the instructions are executable to move a field of view (FOV) of at least one of the cameras responsive to user input. In some embodiments the instructions can be executable to switch presentation of video on the display from one feed to another feed responsive to user movement through the venue.

In another aspect, in a system with plural video cameras providing plural video feeds of a venue, at least one media server receiving the feeds, at least one display, a method includes receiving a location of a user device, identifying a destination, and presenting on the display at least one of the video feeds showing a portion of the venue in which the location of the user device is and also showing the destination, along with an indication of a route to the destination from the location.

In another aspect, a media server includes at least one processor configured with instructions to identify a location of a user device in a venue, and using the location, provide on at least one display video of the venue that changes images of the venue on the display to account for movement of the user through the venue.

The details of the present disclosure, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device-based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft or Unix or Apple, Inc. or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java®, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as, e.g., a computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
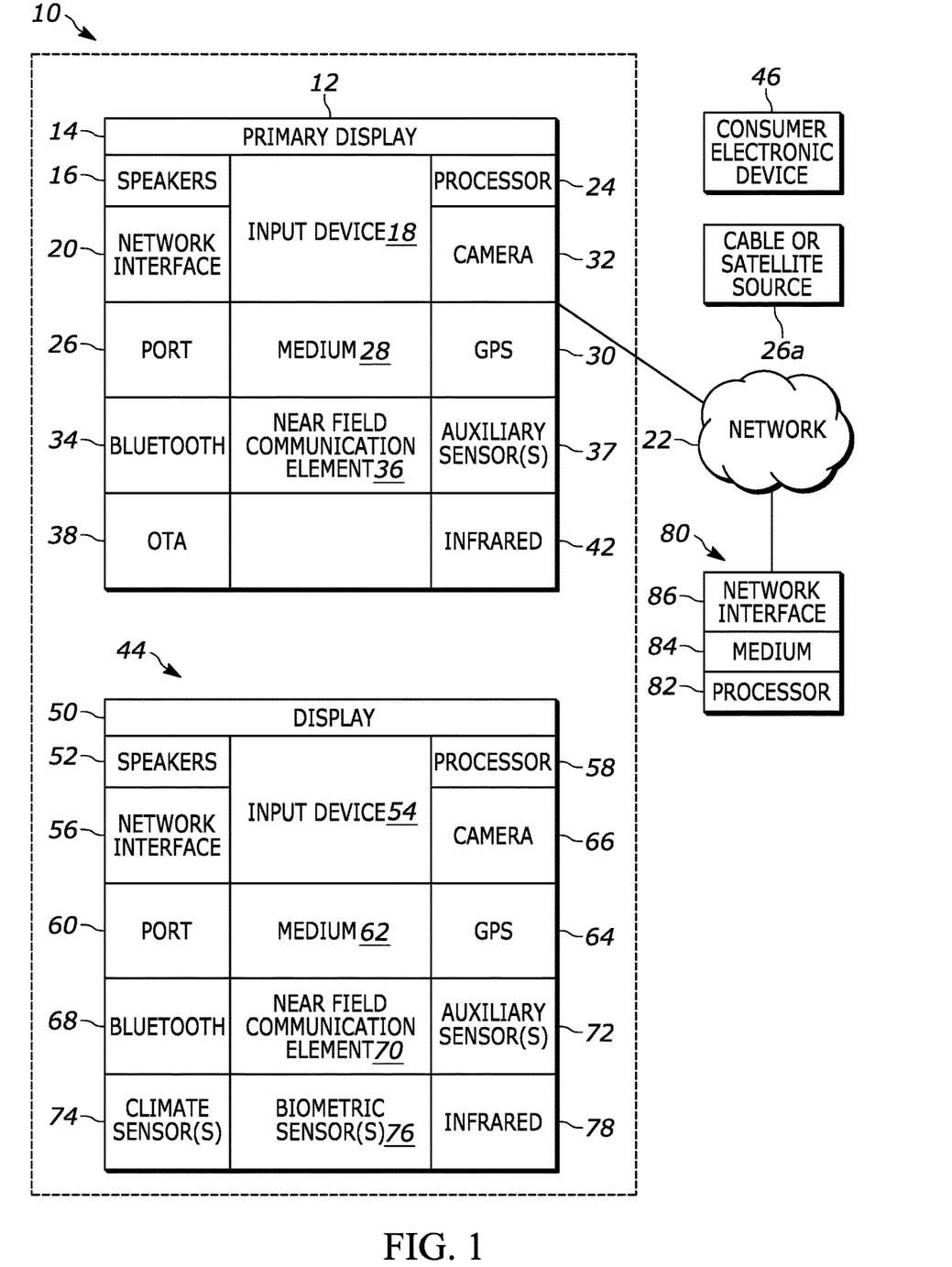
FIG. 1 is a block diagram of an example system including an example in consistent with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as a keyboard or keypad or an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to send messages to a second CE device 46 may include similar components as the first CE device 44 and hence will not be discussed in detail. In the example shown, only two CE devices 44, 46 are shown, it being understood that fewer or greater devices may be used.

The example non-limiting first CE device 44 may be established by any one of the above-mentioned devices, for example, a portable wireless laptop computer or tablet computer or notebook computer or mobile telephone, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as a keypad or keyboard or audio receiver/microphone for entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (for instance, using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

At least one server 80 may include at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Devices discussed below may include some or all, as appropriate, of the various components shown in FIG. 1.

Figure 2:
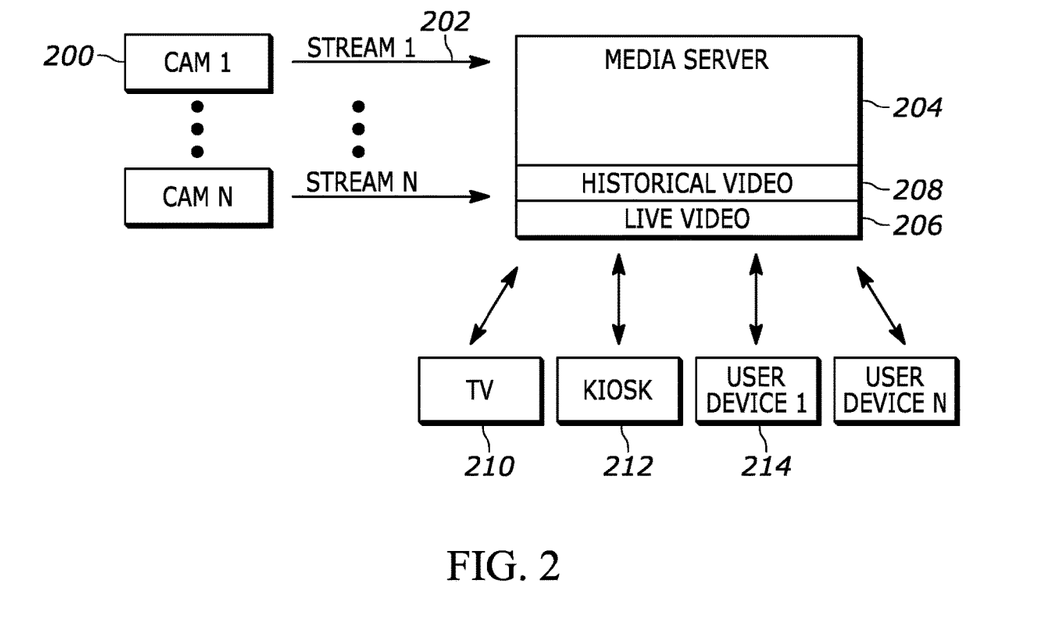
FIG. 2 illustrates an example video system at a location.

Now referring to FIG. 2, a system includes plural video cameras 200 in a location such as a shopping mall, inside a building and the environs, other venues or parts of the world, vacation spots, resorts, ships, virtual tours so that as the tour operator is talking the viewer can remotely control the camera as if they are walking with the tour operator, and other forums described herein.

Each camera 200 sends a respective view stream 202 to one or more media servers 204 via, e.g., the Internet ("cloud"). The media server 204 provides live video 206 and/or historical video 208 of the location to devices including TVs 210 at the location, kiosks 212 at the location, and user devices 214 at the location such as any of the CE devices described herein.

This system in FIG. 2 of viewing objects is designed to mirror (live or video-on-demand) what it would be like to actually be viewing outside of a building or enclosed space in order to calibrate one's location relative to where one wants to go. It is a way to automate digital signage kiosks such as in airports, public buildings, large malls, universities, stadiums, using artificial intelligence if desired such that the viewer gets a personalized walkthrough of precisely what he needs to see for his personal navigation path. The walkthrough is provided by live 360 degree cameras 200 that can be manipulated automatically, remotely and placed strategically throughout a venue, generating a viewing session, such that a large space is virtually covered and a person can walk the entire venue from the kiosk or TV or monitor. The viewing session includes video streams 202 from multiple cameras 200 and camera angles covering a range of locations that can be concatenated into a single video stream to deliver a series of video frames that matches an individual's path to reach a final destination. The server 204 hands off the streams as the viewer leaves one camera area and arrives within the scope of another camera. Communication among the devices shown in FIG. 2 may use wireless mesh communication techniques.

Figure 3:
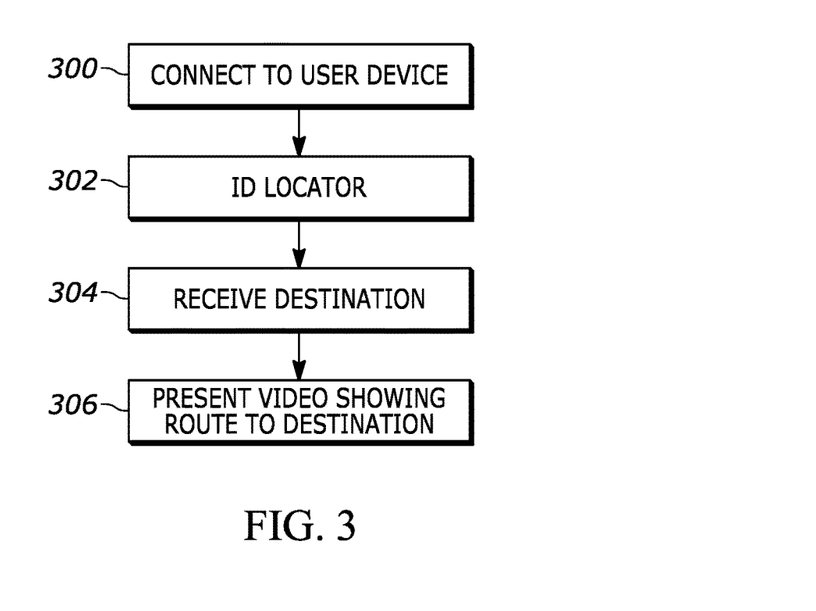
FIG. 3 illustrates example logic in example flow chart format that can be implemented by the system in FIG. 2.

FIG. 3 illustrates the above principles. Commencing at block 300, the media server 204 in FIG. 2 connects to a user device 214 in a venue. Moving to block 302, the media server identifies the location of the user by, e.g., accessing GPS information from the user's user device.

Proceeding to block 304, a desired destination is received. In one embodiment, the user may say or enter a destination, such as "my car" or "exit". Or, the cameras 200 may image the user throughout his presence in the venue and using face recognition, the media server 204 can identify where the user entered the venue or exited his vehicle outside a building of the venue and automatically present to the user at block 306 a video of the portion of the venue between the user's current location and the destination, along with an indication of the route to the destination.

Figure 4:
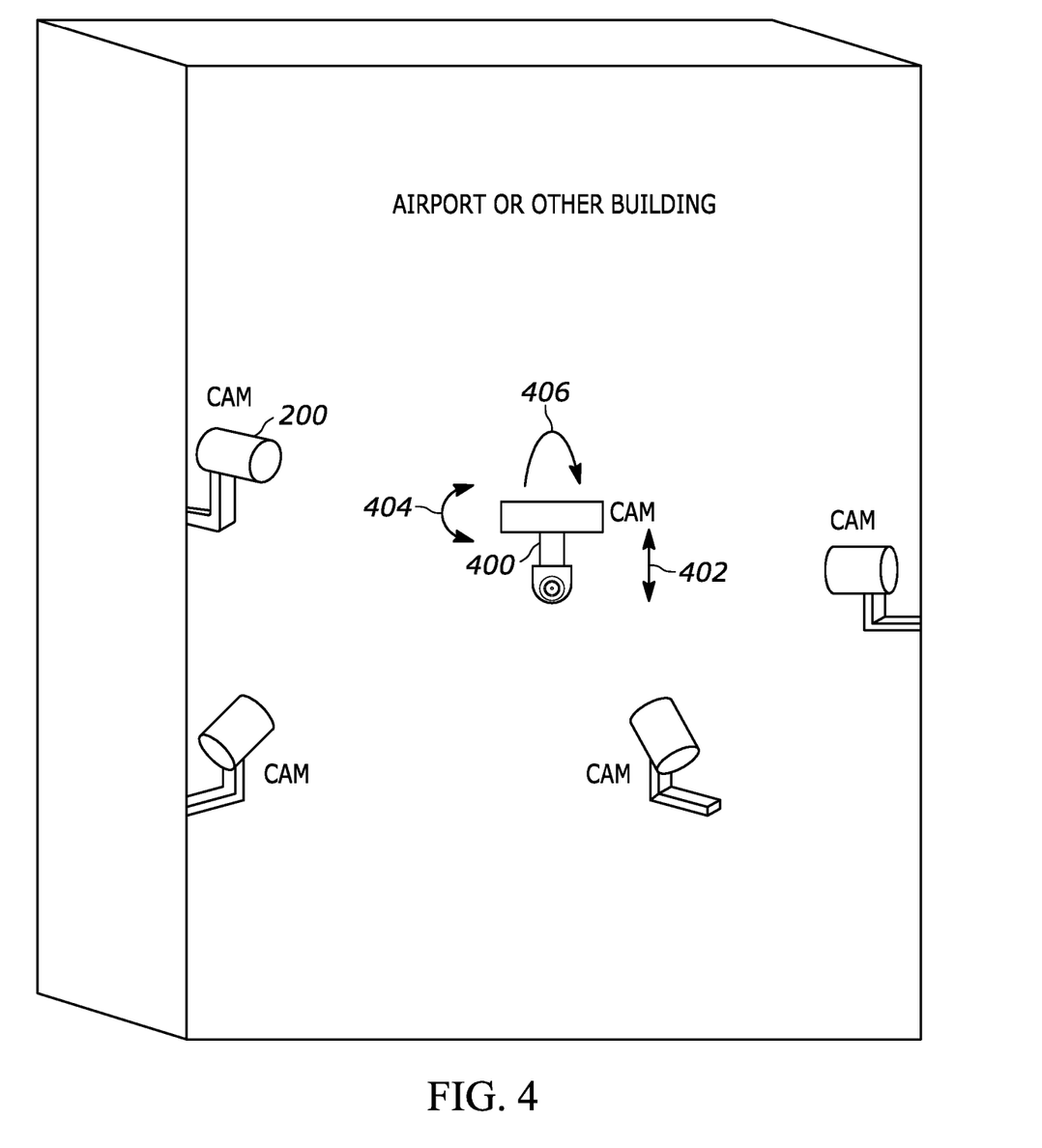
FIG. 4 provides further illustration of example aspects of the system in FIG. 2.

FIG. 4 illustrates that one or more of the cameras 200 in FIG. 2 may be movable by means of being mounted on a movement mechanism 40 such as a gimbal. The field of view (FOV) of the camera alternatively may be moved optically. In any case, the media server 204 may actuate the camera to change its FOV translationally as indicated by the up-and-down arrows 402, and/or in the pan dimension as indicated at 404, and/or in the tilt dimension as indicated at 406. The camera may be moved automatically by the media server to track the user or to maintain a view in front of the user as the user moves, or in response to user commands.

Figure 5:
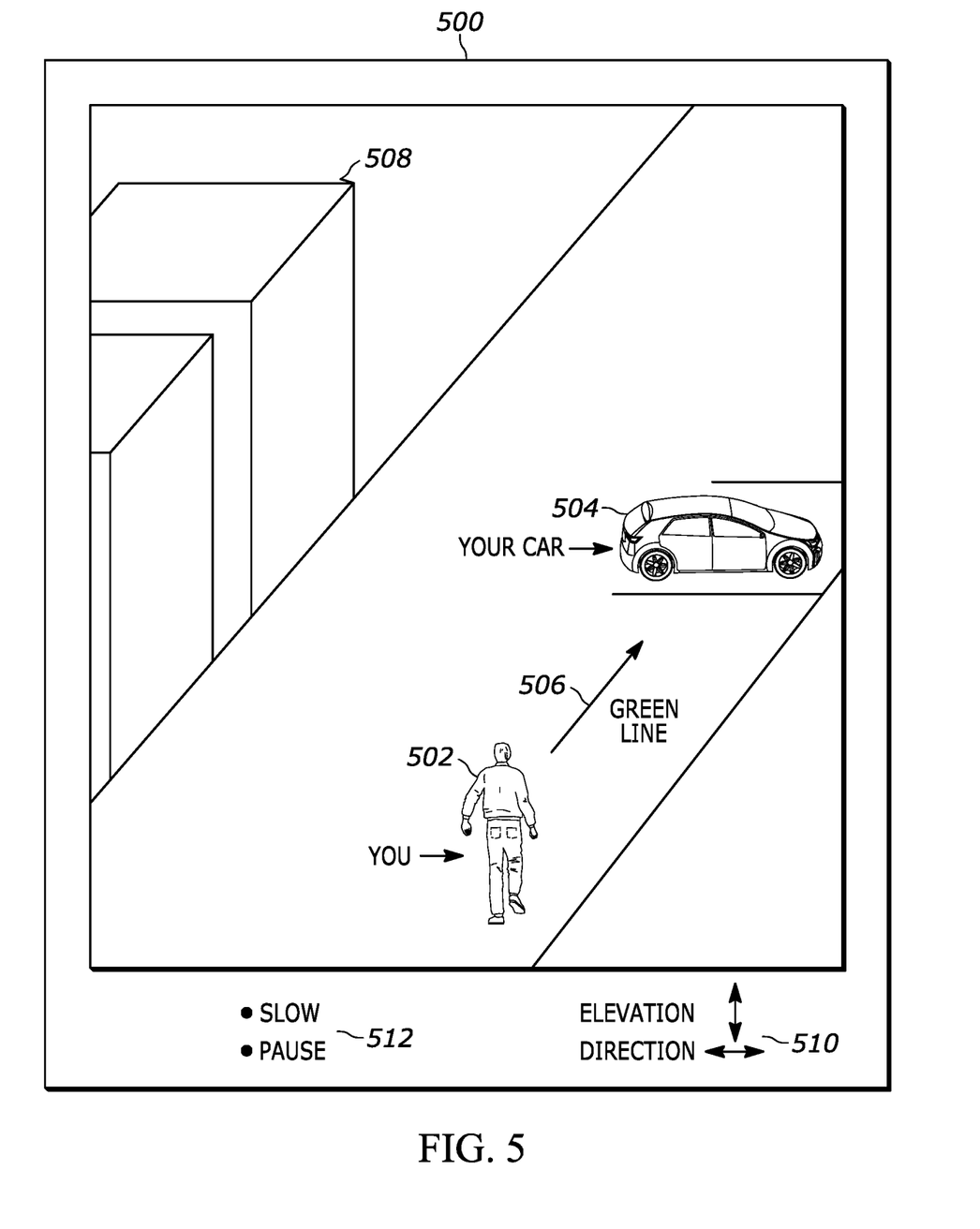
FIG. 5 illustrates an example video presentation that can be provided by the system.

For example, one implementation would be in a large mall. FIG. 5 illustrates.

Assume that a user may seek to identify where his car is. The user may scan a parking ticket into his device or a kiosk or provide a license plate number, and in response the server 204 in FIG. 2 can access an AI database of cars entering the mall and where they ended up parking. The location from the kiosk or viewers smart TV or other user device would then be calculated and the precise route from the user to the destination established. A display device 500 such as any disclosed herein may present one or more feeds from the 360 degree cameras 200 and/or historical video of the venue showing the user, imaged as indicated at 502, a live video of how to get to his destination (in the example shown, his vehicle 504) from the current location along with an indication 506 (in the example, a line that may be colored green). Objects 508 such as nearby buildings also appear on the video just as they would in real life to the user. The display 500 may present selectors 510 that the user can manipulate to change the FOV in elevation and direction and video playback selectors 512 that the user can use to slow or pause the video.

Another option is to pull up a video on demand file that matches a set of common directional video streams for each camera in sequence. The viewer could slow the video down and look up and around for visual markers so as to become familiar with the actual surroundings of the path. This allows for visual path recognition and scenic memory cues to be remembered and then the path is easier to remember than a map. This type of navigation assistant seeks to provide a virtual walking or directional assistant. Each 360 degree camera would have a range built in that it covers and the system would link cameras together that overlap in coverage and then notify another camera using a central session controller (e.g., the media server 204 shown in FIG. 2) that its range is reaching the max and to hand of the video session to its neighboring camera. This type of location device stitching of videos can be live or VOD where common destinations are recorded so as to leave cameras open for live quick views of different outside destination from within a building. Large venues such as convention centers would show a sped up live clip of how to get to a desired location such as a large conference room or area.

Thus, a media server and application software running in the cloud controls each 360-degree camera and mount system located remotely across a property or building, and also controls each kiosk or TV that is connected to a mesh wireless signaling network back to the servers. All of this together comprise the entire landscape of connected IoT and smart devices for remote viewing and real-time directions. This control room or operations center is needed such that any kiosk can switch to another live camera view or pull up a historical VOD view that matches the viewers needs for location assistance. The cameras may have smart features such as optical zoom capabilities on the cameras, directionality markers, and clearly marked of viewing for 360-degree cameras pan, tilt, zoom functions. Sensors built into the cameras for temperature, time of day, object recognition, and other visual assistance may establish an AI portion that supplements the core function of the cameras and TVs for video rendering. Cloud software understands signaling to the cameras to move that originate from the kiosk or TV. The Cloud can then translate a user's head movements or joystick movements or D-pad movement, whereby the camera matches the movements of the user's choice as the user creates his virtual map. Cloud software may translate viewing angles which can move the camera toward the direction of the user's gaze and view. For example, using face, head and eye tracking software, a device such as the TV 210 in FIG. 2 can signal the cameras to turn right or left to expand the view or zoom in on an object. This software could also be built into the TV that tracks head movements to know what direction a person wishes to go.

Figure 6:
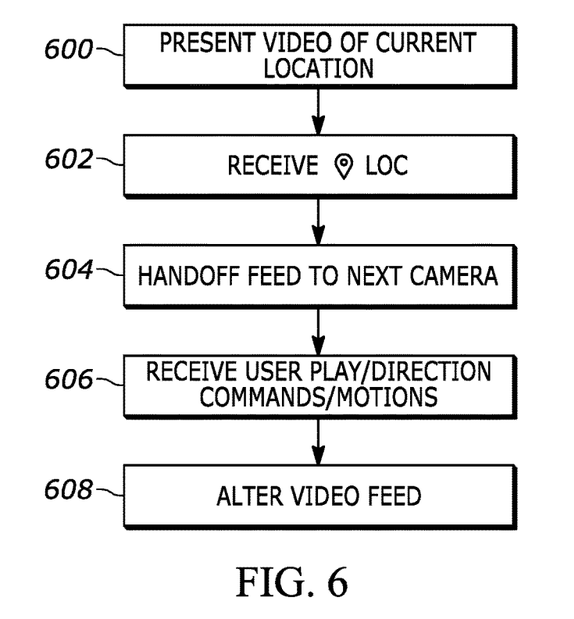
FIG. 6 illustrates additional example logic in example flow chart format.

FIG. 6 illustrates further. Commencing at block 600, a video is presented to a user of the user's current location. Moving to block 602, as the user perambulates through the venue updated location information is received and when the user reaches the boundaries of the current feed the next video feed commencing at the boundary is presented in a seamless handoff at block 604.

Block 606 indicates that user video play and direction commands or indications may be received at block 606. For instance, eye tracking may be executed on images of the user from one of the video cameras and video presented of the space along the user's line-of-sight, altering the video at block 608 that is presented on the display 500 in FIG. 5 accordingly.

This system allows someone inside to virtually see outside and look around, picking various angles to view from and locations such that is serves as a precise direction finder and an object identifier. For example, once a person emerges from building the person can then see a video of the street markers that remind the person where the person needs to go. The person can check temperature, traffic levels, and weather outside the building using the video feed.

Figure 7:
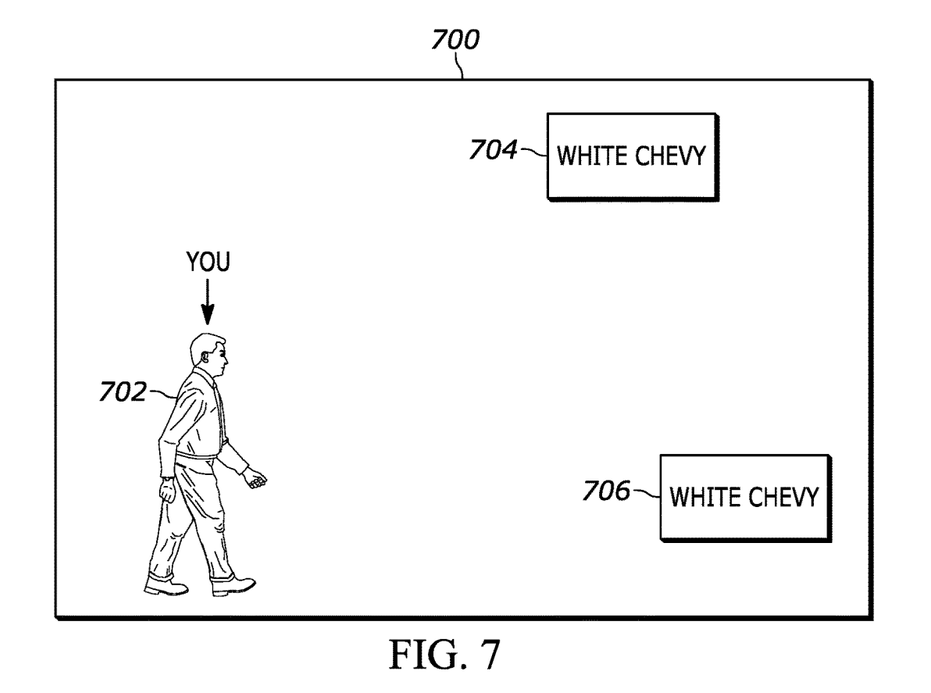
FIG. 7 illustrates an example video frame showing a user where he may have parked his car.

Moreover, as illustrated in FIG. 7, a display 700 such as any of the displays disclosed herein may present a video of a parking lot with an image 702 of the user and images 704, 706 of vehicles fitting a general description that the user may have given, e.g., "white Chevy". The display 700 presents a video showing how to get to one of the vehicles from the vantage point of the person walking out the door.

Thus, present principles provide a real-time, personalized, video-based system or service that uses a matrix of 360-degree cameras for directional remote navigation. Primarily because 360-degree video is a recent innovation, the ability to stitch videos together is also a recent innovation. Moreover, the Cloud server that manages the IoT devices (the network of cameras, the network of TVs or kiosks, and the signaling protocols based upon smart TV/devices) can translate face/head/eye movements into matching camera movements. All of these techniques can be applied to buildings and large venues that can be programmed to provide directional services based on license plate, face recognition upon entering, and common directional VOD programs that are played back as if the user were carrying a camera as the user walked the path himself. An aspect of this system is in the combining of technologies together and creating a system that responds in real time to viewers remotely located to provide video that is actively updated such that the precise location of real time objects is presented in private building or private large venues.

Present principles create a working system that generates its own historical mapping paths which can be stored on servers and pulled up for those who already travelled that exact same path. Over time the directions become commonplace for finding static objects such as a parking space. It also can go live when it needs to for real time object identification of a user's own car in the last camera video segment sent back showing the car and license plate live. Thus, there can be a mixture of VOD and live video to free up cameras that are needed for another live session. Pieces of videos for each 360-camera degree segment can be stitched together in the Cloud to deliver the smooth walking path video with the proper elevations and visual cues. Practical applications of this virtual video directions service include any location that could benefit from shoppers, tourists, travelers, or attendees being unfamiliar with an area or simply needing to recall their surroundings. People get busy and forget how they arrived somewhere and get disoriented. Most mapping services do not account for the context or surrounding objects particularly well in a live setting. Thus, an AI component may be implemented by the system where visual cues can help generate a map without having to have all the final end points declared.

For instance, if a user cannot remember a license plate number, face recognition or visual cues put into the system can generate a likely path with a measure of certainty. The quality of the video should be 1080p HD or higher, such as 4K, to be able to zoom in on an object with enough detail. Cameras should also have a 14-16 stop capability for high dynamic range tone mapping to account for bright light and low light conditions and retail enough detail in colors.

While particular techniques are herein shown and described in detail, it is to be understood that the subject matter which is encompassed by the present application is limited only by the claims.

What is claimed is:

1. A system, comprising:
   plural video cameras providing plural video feeds of a venue;
   at least one media server receiving the feeds and comprising at least one processor programmed to access instructions; and
   at least one display configured to communicate with the processor;
   the instructions being executable by the processor to:
   receive a location of a user device, the user device not comprising one of the plural video cameras;
   identify a destination at least in part based on one or more of:
     user input of the destination, or
     face recognition of a user, or
     a scan of a parking ticket, or
     a license plate number, or
     combinations thereof; and
   present on the display at least one of the video feeds showing a portion of the venue in which the location of the user device is and also showing the destination, along with an indication of a route to the destination from the location.

2. The system of claim 1, wherein the display is implemented on the user device.

3. The system of claim 1, wherein the display is implemented on a TV in the venue.

4. The system of claim 1, wherein the display is implemented on a kiosk in the venue.

5. The system of claim 1, wherein the instructions are executable to:
   alter presentation of video on the display responsive to head or eye movement of the user.

6. The system of claim 1, wherein the instructions are executable to:
   move a field of view (FOV) of at least one of the cameras responsive to user input.

7. The system of claim 1, wherein the instructions are executable to:
   switch presentation of video on the display from one feed to another feed responsive to user movement through the venue.

8. The system of claim 1, wherein the instructions are executable to identify a destination at least in part based on user input of the destination.

9. The system of claim 1, wherein the instructions are executable to identify a destination at least in part based on face recognition of a user.

10. The system of claim 1, wherein the instructions are executable to identify a destination at least in part based on a scan of a parking ticket.

11. The system of claim 1, wherein the instructions are executable to identify a destination at least in part based on a license plate number.

12. In a system comprising plural video cameras providing plural video feeds of a venue, at least one media server receiving the feeds, at least one display, a method comprising:

receiving a location of a user device;

identifying a destination; and presenting on the at least one display at least a first one of the video feeds showing a portion of the venue in which the location of the user device is and also showing the destination, along with an indication of a route to the destination from the location, wherein the first one of the video feeds comprises a video from a current location of the user device to the destination, along with objects along a route from the current location to the destination to allow for visual path recognition and scenic memory cues.

13. The method of claim 12, wherein the display is implemented on the user device.

14. The method of claim 12, wherein the display is implemented on a TV in the venue.

15. The method of claim 12, wherein the display is implemented on a kiosk in the venue.

16. The method of claim 12, comprising:

altering presentation of video on the display responsive to head or eye movement of the user.

17. The method of claim 12, comprising:

moving a field of view (FOV) of at least one of the cameras responsive to user input.

18. The method of claim 12, comprising:

switching presentation of video on the display from one feed to another feed responsive to user movement through the venue.

19. The method of claim 12, comprising:

linking first and second of the plural video cameras together that overlap in coverage; and handing over presentation of the video feed on the display from the first video camera to the second video camera as the user device moves toward the second camera.

20. A media server comprising:

at least one processor configured with instructions to:

identify a location of a user device in a venue;

using the location, provide on at least one display video of the venue that changes images of the venue on the display to account for movement of the user through the venue at least in part by changing a video feed to the display from being sourced from a first camera to being sourced from a second camera as the user moves between the first and second cameras.

21. The media server of claim 20, wherein the display is implemented on the user device.

22. The media server of claim 20, wherein the display is implemented on a TV or kiosk in the venue.

23. The media server of claim 20, wherein the instructions are executable to:

alter presentation of video on the display responsive to head or eye movement of the user.

24. The media server of claim 20, wherein the instructions are executable to:

move a field of view (FOV) of at least one of the cameras responsive to user input.

25. The media server of claim 20, wherein the instructions are executable to:

switch presentation of video on the display from one feed to another feed responsive to user movement through the venue.

* * * * *